W. R. Crocker,
Cork Machine.

Nº 37,543.    Patented Jan. 27, 1863.

UNITED STATES PATENT OFFICE.

JEDEDIAH LEAVENS, OF NORWICH, CONN., ADMINISTRATOR OF THE ESTATE OF WM. R. CROCKER, LATE OF SAID PLACE, NOW DECEASED.

IMPROVEMENT IN MACHINERY FOR CUTTING CORKS AND BUNGS.

Specification forming part of Letters Patent No. 37,543, dated January 27, 1863.

*To all whom it may concern:*

Be it known that WILLIAM R. CROCKER, late of Norwich, in the county of New London and State of Connecticut, did invent certain new and useful Improvements in Machines for Cutting Corks, Bungs, and other Articles; and it is hereby declared that the same are described and represented in the following specification and accompanying drawings, in which—

Figure 1:
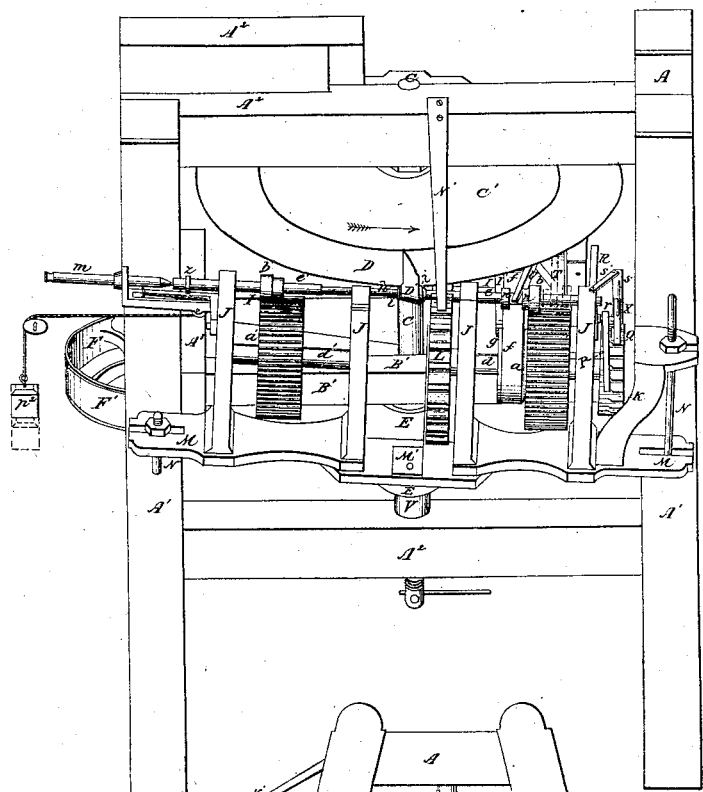
Figure 2:
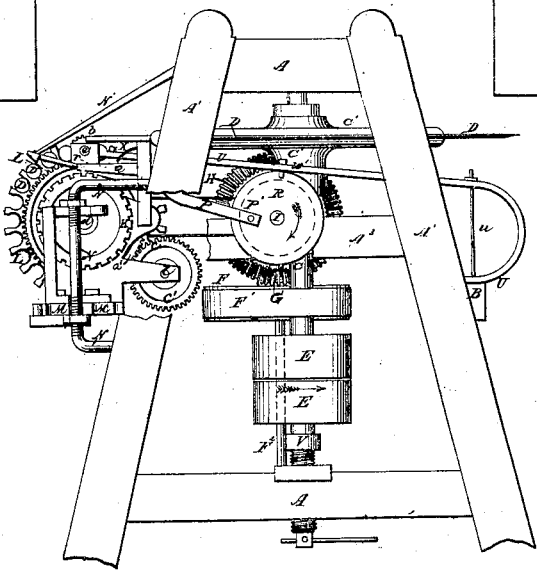

Figure 1 is a perspective view of the front of the machine, and Fig. 2 an elevation of one end.

The nature of this invention consists in combining with a rotating knife certain devices for taking the corks from a feeding-wheel and carrying them endwise to the knife, which cuts them straight or tapering, as required, and then they are returned to the feeding-wheel; and in a feeding-wheel which carries the corks to the gripping-spindles and receives the corks from the spindles after they are cut; also, in certain mechanism for turning and holding the feeding-wheel automatically.

In the accompanying drawings, A' A' are the posts of the frame of the machine, connected by the girders A A, which posts and girders are connected by the bars $A^2$ $A^2$, making a strong frame, to which the other parts of the machine are fastened or connected.

C is an upright shaft, turning in the screw V and in a box fastened to the bar $A^2$. This shaft is turned to operate the machine by a band from some power to the pulley E. The disks C' C' on the shaft C clamp and carry the knife D, which cuts the corks D'.

F' is a band from the shaft C to the pulley F on the shaft $F^2$, which turns in the girder A and bar $A^3$, and carries the gear G, which turns the gear H and shaft I, which turns in the bars $A^3$ $A^2$, and carries the pulley I' and band $f$, which carries the pulley $g$ and gear $a$, which turn loose on the shaft $d$, which shaft turns in the posts J J in the bar M, which is adjusted by screw-nuts on the stands N N, fastened in the frame A'. The gear $a$ carries the gear $b$ and spindle $e$, with a toothed head, $i$, to hold and turn the cork while it is cut. The gear $a$ also turns the gear $c$ and shaft $l$, which turns in arms from the posts J J and carries a second gear, like $c$, which turns the gear $a'$ and shaft $d'$ and the gear $b'$ and spindle $e'$ with the same velocity that the spindle $e$ is turned. The shaft $d'$ and spindle $e'$ both turn in the posts J J, Fig. 1, and the spindle $e'$ is made small at $h$, to hold the small end of small corks without coming in contact with the knife D, and the end $i'$ of the spindle is toothed to hold and turn the cork. The bar B is fastened to the posts A', and has the bolt $u$ passing through it, on which the lever U vibrates, being carried by the grooved cam T on the shaft I, acting on the pin $u'$ in the lever U, which works in the grooved collar $n$ $n$ and traverses the spindle $e$, to feed the corks to the knife D. The spindle $e'$ yields as the cork D' is pressed against it, raising the weight $P^2$, which acts on the sliding spindle $m$, to press the spindle $e$ forward, which stops when the collar $z$ comes to the post J, and prevents the end of the spindle from entering the scores in the feed-wheel L, and releases the cork after it is cut, and lets it fall into the score in the feed-wheel from which it was taken. The shaft $d$ turns loose in the pulley $g$ and gear $a$, and carries the feeding-wheel L, which is fastened to it. This shaft is turned by the ratchet K, fastened to the opposite end, and moved by pawl P, which is carried by the crank-pin P' in the disk R on the shaft I, and to hold the ratchet and feed-wheel still while the cork is being cut a dog, Q, is fastened to the stand S, which is supported by the post J. This dog is pressed into the ratchet by the spring X, and raised out of it, at a proper time, by the pin $r$ in the pawl P, which acts on an inclined plane on the side of the dog. The stand M' is fastened to the bar M, and extends up by the side of the feed-wheel, to prevent the corks from being pushed so far through as to strike the end $i'$ of the spindle as the feed-wheel is turned. The spring N' is fastened to the bar $A^2$, to hold the corks in the feed-wheel until the spindle-heads grasp them firmly. A pin may be put in the side of the lever U, to push the corks out of the feed-wheel after they are finished; or they may be allowed to fall out of the under side of the wheel as it turns. A series of feed-wheels may be provided with scores of different sizes, adapted to the corks to be cut.

The operator takes the corks, which have been cut circular by the machine patented to said Wm. R. Crocker in 1855, No. 13,714, and places them in the scores in the feed-wheel L, which carries them up between the spindle-heads $i$ and $i'$, when the spindle $e$, traversed by the lever U, moves the cork D' against spindle-head $i'$, so as to grip it firmly and turn it rapidly and carry it in contact with the knife D, which cuts it smooth, either tapering or straight, as may be required, at the rate of twenty-five or thirty corks per minute, when they are returned to the feed-wheel, which is moved forward, and the next cork is gripped and cut in the same manner. The knife D may be adjusted higher or lower by turning the screw V, and the bar M may be adjusted higher or lower by the nuts on the stands N N, to cut large or small corks, and to cut them straight the bar M should be parallel with the plane of the knife, and to cut them tapering or conical the left hand end of the bar should be placed highest.

I believe I have described and represented the improvements invented by WM. R. CROCKER so as to enable any person skilled in the art to make and use them.

I will now state what I desire to secure by Letters Patent as his invention, to wit:

1. In combination with a rotating knife, the gripping and rotating apparatus which feeds the corks to the knife, substantially as described.

2. The feeding-wheel L, for the purpose of feeding the corks to the gripping-spindles, substantially as described.

3. In combination with the feeding-wheel L, the mechanism described, or its equivalent, for turning and holding the feeding-wheel.

JEDEDIAH LEAVENS,
*Administrator of the estate of W. R. Crocker.*

Witnesses:
H. L. READE,
JESSE D. NOYES, 2d.